(12) United States Patent
Valenziano

(10) Patent No.: US 8,318,304 B2
(45) Date of Patent: Nov. 27, 2012

(54) INTUMESCENT ROD

(75) Inventor: Philip F. Valenziano, Colts Neck, NJ (US)

(73) Assignee: Alva-Tech, Inc., Burlington, NJ (US)

(*) Notice: Subject to any disclaimer, the term of this patent is extended or adjusted under 35 U.S.C. 154(b) by 155 days.

(21) Appl. No.: 12/625,248

(22) Filed: Nov. 24, 2009

(65) Prior Publication Data

US 2011/0123801 A1  May 26, 2011

(51) Int. Cl.
*D02G 3/00* (2006.01)

(52) U.S. Cl. .......... 428/372; 428/370; 428/373

(58) Field of Classification Search .......... 428/372, 428/359, 394, 370, 373; 404/67, 47; 277/906, 277/404, 407, 590
See application file for complete search history.

(56) References Cited

U.S. PATENT DOCUMENTS

| | | | |
|---|---|---|---|
| 2,009,547 A | | 7/1935 | Ginder |
| 3,100,677 A | | 8/1963 | Frank et al. |
| 3,455,850 A | * | 7/1969 | Saunders ............ 521/170 |
| 3,869,831 A | | 3/1975 | Gibb |
| 4,058,947 A | | 11/1977 | Earle et al. |
| 4,374,207 A | * | 2/1983 | Stone et al. ............ 521/107 |
| 4,380,593 A | | 4/1983 | von Bonin et al. |
| 4,454,190 A | * | 6/1984 | Katagiri .............. 442/325 |
| 4,588,523 A | * | 5/1986 | Tashlick et al. ............ 252/606 |
| 4,621,956 A | | 11/1986 | Hartman et al. |
| 4,622,251 A | | 11/1986 | Gibb |
| 4,622,794 A | | 11/1986 | Geortner |
| 4,784,516 A | | 11/1988 | Cox |
| 4,824,283 A | | 4/1989 | Belangie |
| 4,825,617 A | | 5/1989 | Kinoshita et al. |
| 4,839,223 A | * | 6/1989 | Tschudin-Mahrer ...... 428/317.1 |
| 4,857,364 A | * | 8/1989 | von Bonin .............. 427/254 |
| 4,927,291 A | | 5/1990 | Belangie |
| 4,931,484 A | | 6/1990 | Hovis et al. |
| 4,977,719 A | | 12/1990 | LaRoche et al. |
| 4,996,099 A | * | 2/1991 | Cooke et al. .............. 442/4 |
| 5,007,765 A | | 4/1991 | Dietlein et al. |
| 5,024,554 A | | 6/1991 | Benneyworth et al. |
| 5,058,342 A | | 10/1991 | Crompton |
| 5,059,631 A | | 10/1991 | Hovis et al. |
| 5,072,952 A | | 12/1991 | Irrgeher et al. |
| 5,098,782 A | | 3/1992 | Hovis et al. |
| 5,130,176 A | | 7/1992 | Baerveldt |
| 5,190,395 A | | 3/1993 | Cathey et al. |
| 5,195,282 A | | 3/1993 | Campbell |
| 5,197,250 A | | 3/1993 | Kramer |
| 5,213,441 A | | 5/1993 | Baerveldt |
| 5,253,459 A | | 10/1993 | Parinas et al. |
| 5,269,110 A | | 12/1993 | Morrison et al. |
| 5,276,064 A | | 1/1994 | Hartman |
| 5,277,515 A | | 1/1994 | Hovis et al. |
| 5,311,715 A | | 5/1994 | Linck et al. |

(Continued)

OTHER PUBLICATIONS

Alva-Tech Inc. Fire Stop Product Sheet, published 2010.
Product Data Sheet for Alva-Tech Intumescent Foam Sheet FIFS, published 2010 (product sold as least as early as 2007).
Product Data Sheet for Alva-Therm Intumescent Sheet, published 2010, (product sold at last as early as 2007).

(Continued)

*Primary Examiner* — N. Edwards
(74) *Attorney, Agent, or Firm* — Florek & Endres PLLC

(57) ABSTRACT

An intumescent rod comprising an intumescent component formed of an intumescent material and a polymer matrix. The intumescent rod may include a second component forming a covering, core or layer adjacent the intumescent component. A method for manufacturing an intumescent rod including molding or extrusion of at least one of an intumescent component and an optional second component.

8 Claims, 2 Drawing Sheets

U.S. PATENT DOCUMENTS

| | | | |
|---|---|---|---|
| 5,335,466 A | | 8/1994 | Langohr |
| 5,387,050 A | | 2/1995 | Hovis et al. |
| 5,439,319 A | | 8/1995 | Flanagan et al. |
| 5,440,847 A | | 8/1995 | Butler |
| 5,482,686 A | * | 1/1996 | Lebold et al. .................. 422/179 |
| 5,502,937 A | * | 4/1996 | Wilson ............................. 52/273 |
| 5,513,927 A | | 5/1996 | Baker et al. |
| 5,645,926 A | * | 7/1997 | Horrocks et al. ............. 442/234 |
| 5,664,906 A | | 9/1997 | Baker et al. |
| 5,690,447 A | | 11/1997 | Metzger |
| 5,735,633 A | | 4/1998 | Metzger |
| 5,935,695 A | | 8/1999 | Baerveldt |
| 5,948,834 A | | 9/1999 | Scheider |
| 6,039,503 A | | 3/2000 | Cathey |
| 6,131,352 A | | 10/2000 | Barnes et al. |
| 6,231,818 B1 | * | 5/2001 | TenEyck ........................ 422/179 |
| 6,474,074 B2 | * | 11/2002 | Ghoshal ............................ 62/3.7 |
| 6,532,708 B1 | | 3/2003 | Baerveldt |
| 6,666,618 B1 | | 12/2003 | Anaya et al. |
| 6,685,196 B1 | | 2/2004 | Baerveldt |
| 6,747,074 B1 | | 6/2004 | Buckingham et al. |
| 6,898,910 B2 | | 5/2005 | Bellino, Jr. |
| 6,989,488 B2 | | 1/2006 | Valenziano |
| 6,993,874 B2 | | 2/2006 | Trout |
| 6,997,640 B1 | * | 2/2006 | Hohmann, Jr. .................. 404/67 |
| 7,096,629 B1 | | 8/2006 | Cox |
| 7,387,822 B2 | * | 6/2008 | Dinwoodie ................... 427/402 |
| 7,506,480 B1 | | 3/2009 | Chandler |
| 2002/0056242 A1 | | 5/2002 | Andresen |
| 2003/0124930 A1 | * | 7/2003 | Horrocks et al. ............. 442/131 |
| 2003/0213211 A1 | | 11/2003 | Morgan et al. |
| 2004/0203305 A1 | * | 10/2004 | Horrocks et al. ............. 442/138 |
| 2005/0034389 A1 | | 2/2005 | Boot |
| 2005/0176322 A1 | * | 8/2005 | Dinwoodie ................... 442/172 |
| 2006/0117692 A1 | | 6/2006 | Trout |
| 2007/0151185 A1 | | 7/2007 | Robinson |
| 2008/0172967 A1 | | 7/2008 | Hilburn |
| 2011/0123801 A1 | * | 5/2011 | Valenciano ................... 428/394 |

OTHER PUBLICATIONS

Product Data Sheet for Alva-Tech Inc. FB-525 Fire Barrier Material, Underwriters Laboratories, Inc. published 1985, revised 1991, 2003.
Product Data Sheet for Alva-Tech Inc. Fire Barrier Material FB-725 Composite Sheet, Underwriters Laboratories, Inc., published 1992, revised 2007, 2008, 2010.
Product Data Sheet for Alva-Tech Inc. FB-65NH-5 Fire Barrier Material, Underwrtiers Laboratories, Inc., published 1995, revised 2002.
Product Data Sheet for Alva-Tech Intumescent Sheet FBS-10NH, published 2010, (product sold at least as early as 2002).
Product Data Sheet for Alva-Tech Intumescent Sheet FBP-15NH, published 2010, (product sold at least as early as 2007).
Product Data Sheet for Alva-Tech Firestop Brick 27A, published 2010.
F.A.Q.'s for Flex—Protex Joint Fillers, brochure published 2010.
F.A.Q.'s for Intumesecent Products, brochure published 2010.
Alva-Tech Flex-Protex Joint Filler, based on a brochure published 1980, http://www.alva-tech.com/flex-protex/ (viewed Feb. 6, 2012).
Alva-Tech Inc. Fire Stop Product Sheet, published 2012 (viewed Feb. 6, 2012).
Tech Data Sheet: Denver Foam®, Backer Rod Mfg. Inc., Jan. 2009, http://www.bayindustries.com/backerrod/pdf/denverdataDec2009.pdf.
Tech Data Sheet: Mile High Foam®, Backer Rod Mfg. Inc., Feb. 2001 http://www.bayindustries.com/backerrod/pdf/milehightechdata.pdf.
Tech Data Sheet: Ultra Block®, Backer Rod Mfg. Inc., Feb. 2001 http://www.bayindustries.com/backerrod/pdf/ultrablockdata.pdf.
Hilti Corporation CP658 Firestop Plug Product Sheet, undated but believed to be on sale prior to Nov. 24, 2009 (viewed Jul. 26, 2012).
Product Brochure for Flex-Protex C-302, Alva-Tech Inc., pp. 1-4 (1980).
Product Brochure for Flex-Protex C-301 and C-303, Alva-Tech Inc., pp. 1-4 (1980).

* cited by examiner

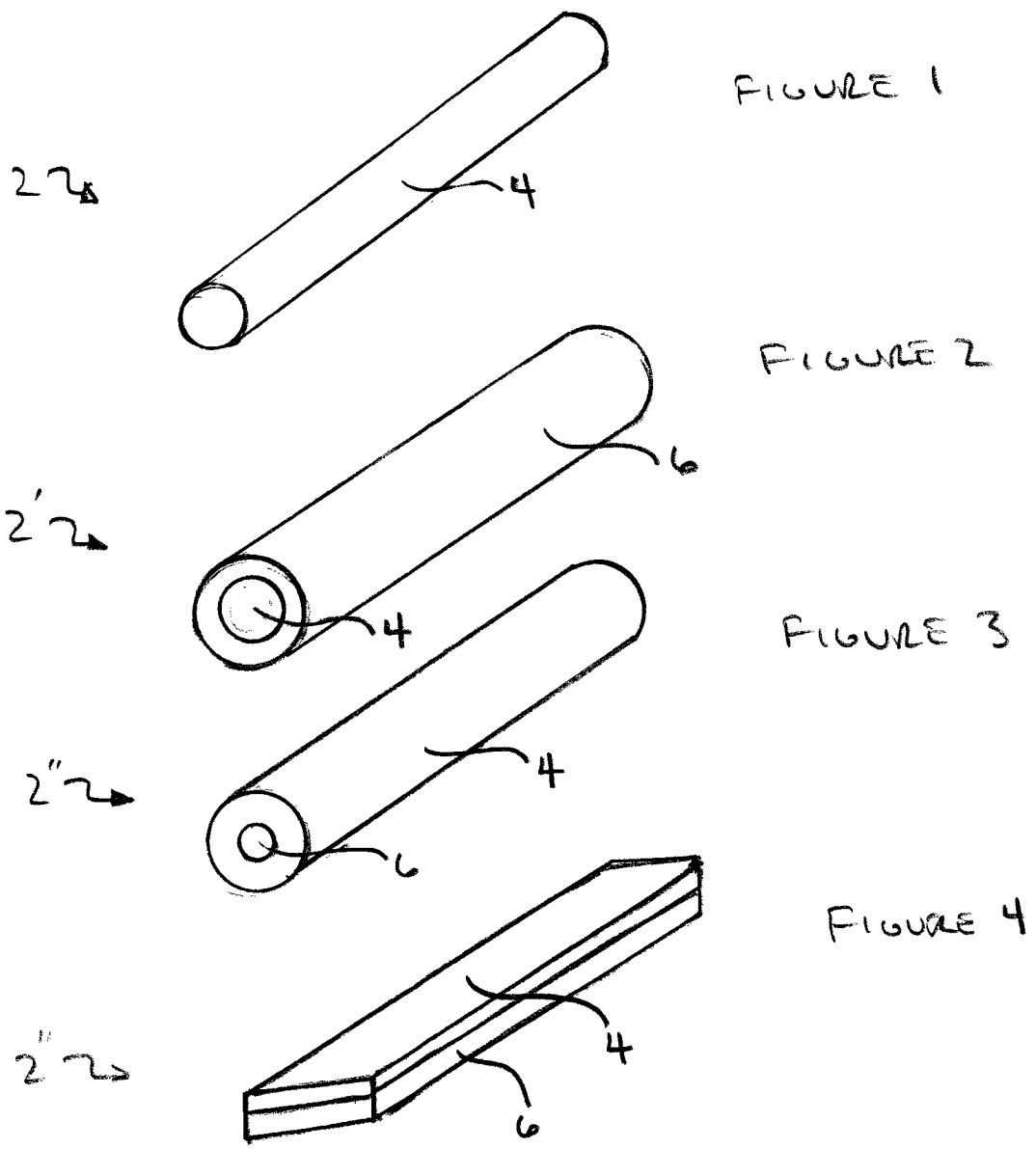

INTUMESCENT ROD

FIELD OF THE INVENTION

The present invention relates to the field of materials for packing joints, cracks or openings, alone or as backer rods prior to applying sealants, and more particularly relating to materials for packing such joints, cracks or other openings to provide a fire resistant environment.

BACKGROUND OF THE INVENTION

Intumescent materials are well known for use in fire rated applications. When subject to fire related conditions, such as very high temperatures, such intumescent materials are designed to expand to fill areas through which smoke and heat can pass in a fire. One such intumescent material for use in fire rated applications is described in U.S. Pat. No. 4,588,523.

As discussed in U.S. Pat. No. 4,588,523, intumescent materials have been used to fill voids left by burning or melting cable insulation. An example of the use of an intumescent material is in a poke through fitting is shown in U.S. Pat. No. 6,989,488, where the intumescent material is designed to fill a pass through hole in a fire rated floor.

In other environments, it is well known to use backer rods to fill spaces in joints, cracks or other openings (hereinafter "gaps"), commonly found in and between building panels such as floors, walls, etc., prior to applying a sealant. In this regard, many gaps are sufficiently deep, wide or extend through panels of several inches or more, making the use of high cost sealants to fill the entire gap inefficient. Backer rods are commonly known to be used to fill the gap to within about ½ inch or so of the surface, thus controlling the depth and amount of sealant needed, so that the sealant needs only to fill the portion of the gap from the backer rod to about the surface of the building panel(s).

This use of backer rods is especially important when the gaps are, for example, between floors of multistory buildings. In these environments, the gaps must be filled with a fire and/or smoke blocking functionality to keep fire and/or smoke from advancing upward from floor to floor. As expected, the sealants providing protection in such fire and/or smoke environments are more expensive than basic sealants.

Backer rods are manufactured by, among others, Backer Rod Manufacturing Inc., under the names MILE HIGH FOAM®, DENVER FOAM® and ULTRA BLOCK®. MILE HIGH FOAM® is a closed cell polyethylene backer rod serving as a backing for elastomeric and other applied caulking sealants. DENVER FOAM® is an open cell polyurethane backer rod serving as a backing for elastomeric and other applied caulking sealants.

ULTRA BLOCK® is a pre-engineered, textile fiberglass with fiberglass matt facing, containing approximately 30% by weight unexpanded vermiculite. This backer rod material is primarily used in fire rated construction joints, and is the subject of U.S. Pat. No. 4,622,251.

As described in U.S. Pat. No. 4,622,251, the ULTRA BLOCK® product comprises a porous sheathing material, comprised of an open weave material, and a porous fiber filling material, described as a ceramic fiber or mineral wool alone or mixed with small particles of minerals such as vermiculite and/or perolite. The filling material is wrapped in the sheathing material, formed in overlapping relationship, and the overlapping area of the sheathing material is sprayed with an adhesive material which passes through the sheathing material overlapping portions to maintain the sheathing material in fixed relation about the filler material.

However, the backer rod of U.S. Pat. No. 4,622,251 is difficult to manufacture and apply, since the filling material is a compacted material of fibers alone or with minerals. Additionally, there is only a minor physical expansion expected from the vermiculite and/or perolite optionally used with the filling material compressed within the sheathing material.

Therefore, there is a need for a better gap filling material for use in fire rated applications, including a backer rod that is especially suitable for fire rated applications.

SUMMARY OF THE INVENTION

The present invention is directed generally to an intumescent rod comprising an intumescent component including an intumescent material in a polymer matrix. The intumescent rod can be any shape, and preferably has a cross section that is substantially round, square, rectangular, triangular, irregular, etc. Moreover, the cross section of the intumescent rod can be of any reasonable dimension, so that different sized cross sections of the intumescent rod can be used to fill gaps of different sizes. Notwithstanding, the intumescent rod of the present invention is preferably formed of a substantially continuous length, at least about 20 times the cross sectional dimension of the intumescent rod.

The intumescent component can be formed as the intumescent rod itself, or can be formed as a core with a covering of a second component, over a core of a second component or in layers with a second component. When formed with a second component, it is preferred that the second component be a polymer material, such as a polyurethane or polyethylene cover, core or layer, and most preferably a foamed polymer material.

The intumescent material used as the intumescent component of the intumescent rod of the present invention can be any suitable intumescent material. Preferably, the intumescent material is an expanding graphite composition further comprising one or more of a variety of other known materials and/or additives. The intumescent component may be foamed or solid, however, the foamed embodiment is preferred for application as a gap filling material.

Although the intumescent component of the intumescent rod can be formed by any known method, it is preferred that it be formed by extrusion or molding. These methods can be used to form the intumescent rod either where the intumescent rod is formed only of an intumescent component or when the intumescent rod is formed of an intumescent component with a second component.

The intumescent rod, when formed of an intumescent component and a second component, can be formed together or in separate steps. For example, the intumescent component and second component can be coextruded or the intumescent material can be formed within a hollow portion of a preformed covering of the second component. Similarly, the intumescent component can be extruded, molded or coated on the outside of a preformed core, or adjacent one or more preformed layers of the second component.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

FIG. 1 is a perspective view of a first embodiment of the present invention, where the intumescent rod is formed of an intumescent component.

FIG. 2 is a perspective view of a second embodiment of the present invention, where the intumescent rod is formed of an intumescent component within a second component.

FIG. 3 is a perspective view of a third embodiment of the present invention, where the intumescent rod is formed of an intumescent component formed about a second component.

FIG. 4 is a perspective view of a fourth embodiment of the present invention, where the intumescent rod is formed of an intumescent component layered with a second component.

DETAILED DESCRIPTION OF THE PREFERRED EMBODIMENT

Figure 5A:
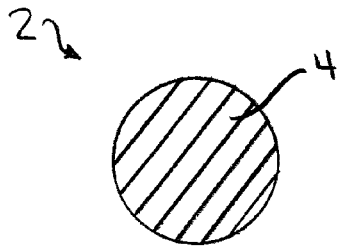
FIG. 5A is a cross sectional view of an intumescent rod of the present invention formed of an intumescent component alone in a circular configuration.

In one preferred embodiment, shown in the accompanying FIGS. 1 and 5A, the intumescent rod 2 is formed of an intumescent component 4 comprising an intumescent material in a polymer matrix. In another embodiment shown in FIGS. 2-4 and 5B-5H, also preferred, the intumescent rod 2 is formed of an intumescent component 4 in combination with a second component 6.

The intumescent component 4 can include any suitable intumescent material that has intumescent characteristics in the presence of fire conditions, i.e., exposure to high heat. Such intumescent materials are well known in the art, including, without limitation, blowing and charring systems such as ammonium poly phosphate or similar phosphate, melamine, and pentaerythritol in a 3:1:1 ratio, graphite, melamine, silicates, including but not limited to sodium silicates, phosphate silicates, lithium silicates and potassium silicates, or like intumescent materials, alone or in combination.

The polymer matrix material used in the intumescent component 4 can also be one of a wide variety of well known matrix forming polymers, otherwise referred to as polymer binders and generally available in the form of resins. For example, suitable matrix forming polymer binders include, but are not limited to, polyurethanes, polyethylenes, polyesters, polyethers, polystyrenes, polyvinylchlorides and the like, individually or in combinations thereof or with other polymer binders.

In addition to the intumescent material and the polymer matrix, the intumescent component 4 of the present invention preferably includes one or more additives, including but not limited to plasticizers, stabilizers, curing agents, surfactants, catalysts, pigments, fillers, water and the like.

The intumescent component 4 comprising the intumescent material in a polymer matrix can be prepared in any manner as will be apparent to one skilled in the art. In this regard, U.S. Pat. No. 4,588,523 provides a suitable method for providing a solid intumescent component 4. The teaching can be adapted to provide a foamed intumescent component 4, which is considered to be preferred for the present invention, with the addition of well known ingredients such as, among other things, catalysts, surfactants, foaming agents and water.

Moreover, although the description for forming the intumescent component 4 may be taken from U.S. Pat. No. 4,588,523, it is understood that the most preferred intumescent material currently contemplated for use in the present intumescent rod 2 of the present invention would be taken from the intumescent materials set forth above, with graphite and blowing and charring systems being most preferred.

The second component 6, when used to form the intumescent rod 2 of the present invention, can be made from any suitable material that provides a covering, core or layering function in the contemplated fire rated environment. Possibilities include any material or filler material that may or may not be insulative, burn, or stay inert in fire conditions. Preferably, however, the second component 6 is formed of a polymer material.

Examples of suitable polymers for forming the second component 6 include, but are not limited to, polyurethane, polyethylene, polyesters, polyethers, polystyrenes, polyvinylchlorides or other such polymers, alone or in combination. Such polymers may be any type, including open cell, closed cell, foamed, solid (unfoamed), films, cross linked, non-cross linked, etc.

Although the second component 6 may be formed as a solid or a foamed material, the most preferred structure is a foamed polymer to provide a greater degree of compression or deformability for the intumescent rod 2 to be introduced into the gap being filled. This degree of compression or deformation of the second component is intended to complement a degree of compression or deformation of the intumescent component 4, especially when using a foamed intumescent component 4.

Various combinations of the intumescent component 4 and second component 6 forming the intumescent rod 2 of the present invention are shown in FIGS. 2-4 and 5B-5H, as described above. In the most preferred embodiment, shown in FIGS. 2 and 5B, the intumescent component 4 is formed within a hollow core of the second component 6.

Although this can be done in any of a variety of ways, the second component 6 may be preformed first, with a hollow core that is then filled with the mixture making up the intumescent component 4. In such an embodiment, there is optionally a slit 8 in the second component for a feed tube to inject the mixture of the intumescent component 4 into the hollow core of the second component 6 for setting up. Thus, the preformed core of the hollow second component 6 acts as a mold for forming the intumescent component 4.

Alternatively, the intumescent component 4 and the second component 6 can be coextruded in a single step, with coextrusion being well known in the molding art, to form the intumescent rod 2 of the present invention. In this method, the mixture for the intumescent component 4 and the mixture for the second component 6 are prepared for coextrusion prior to coextrusion, as is well known in the extrusion art.

Additionally, the shape of the intumescent rod 2, or even the shapes of the intumescent component 4 and/or second component 6 in the intumescent rod 2, can be virtually any shape desired. As shown in FIGS. 5B-5E, round, rectangular and triangular cross sections are contemplated, as are square and irregular shapes (not shown). Likewise, for example, a round intumescent component 4 can form the core of the intumescent rod 2 having a triangular, square, rectangular, irregular, etc., cross section (not shown).

Figure 5C:
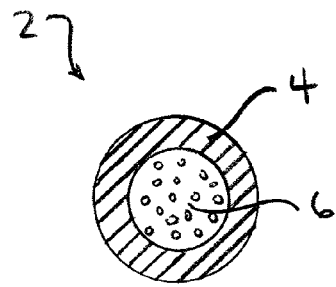
FIG. 5C is a cross sectional view of an intumescent rod of the present invention formed of an intumescent component surrounding a second component in a circular configuration.
Figure 5B:
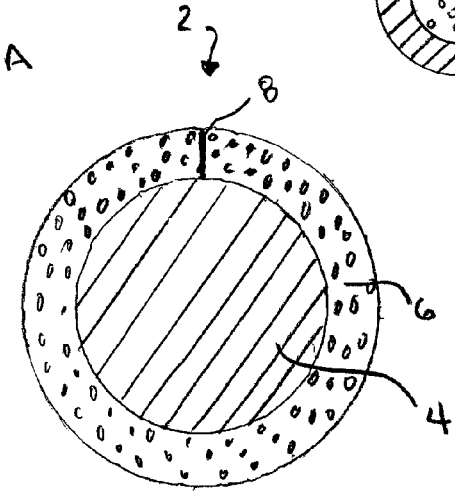
FIG. 5B is a cross sectional view of an intumescent rod of the present invention formed of an intumescent component surrounded by a second component in a circular configuration.
Figure 5D:
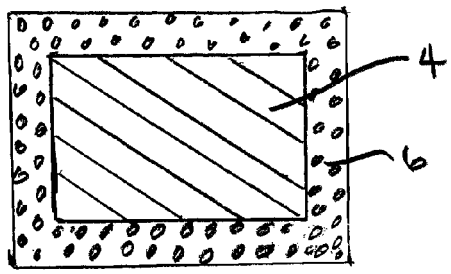
FIG. 5D is a cross sectional view of an intumescent rod of the present invention formed of an intumescent component surrounded by a second component in a rectangular configuration.
Figure 5E:
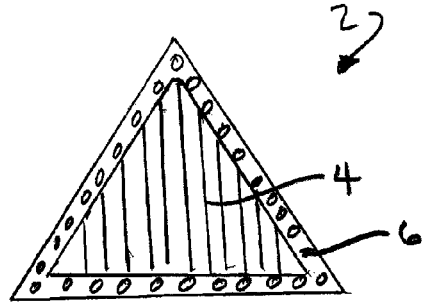
FIG. 5E is a cross sectional view of an intumescent rod of the present invention formed of an intumescent component surrounded by a second component in a triangular configuration.
Figure 5F:
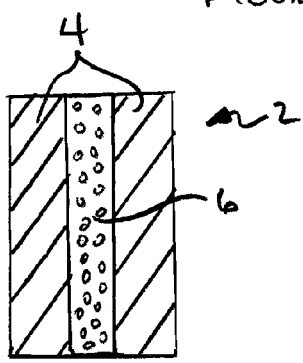
FIG. 5F is a cross sectional view of an intumescent rod of the present invention formed of an intumescent component layered outside of a second component in a rectangular configuration.
Figure 5G:
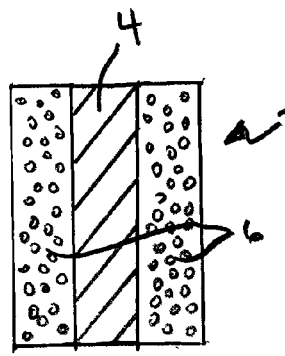
FIG. 5G is a cross sectional view of an intumescent rod of the present invention formed of an intumescent component layered within a second component in a rectangular configuration.
Figure 5H:
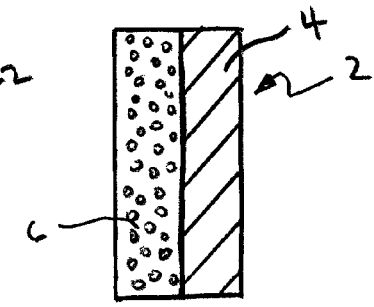
FIG. 5H is a cross sectional view of an intumescent rod of the present invention formed of an intumescent component layered with a second component in a rectangular configuration.

In another embodiment, shown in FIGS. 3 and 5C, the intumescent component 4 can be formed over a core of the second component 6. As with the inverse configuration described above, the intumescent component 4 and second component 6 may be formed of the same general materials and manner as described above. Similarly, the intumescent rod 2 can be formed by molding, extruding, etc., preferably using one or more of a foamed intumescent component 4 and a foamed second component 6.

In another alternative, shown in FIGS. 4 and 5F-5H, the intumescent component 4 can be layered with the second component 6 in any of a variety of combinations. Of course, this is considered to be merely a matter of design choice.

Significantly, the intumescent rod 2 of the present invention provides an added degree of protection in a fire rated environment. More particularly, the polymer materials, in the intumescent component 4 and/or second component 6 melt or burn away in the high heat and/or flame environment and the preferred intumescent material forms an expanded hard or solid insulative char.

The insulative char formed in the gap creates a barrier that is more resistant to the spread of heat, flame and smoke than other backer rod materials. Therefore, although the intumescent rod 2 of the present invention can be used alone, there is an increased effect when used as a backer rod with fire rated or non-fire rated sealants.

Variations, modifications and alterations to the preferred embodiment of the present invention described above will make themselves apparent to those skilled in the art. All such changes are intended to fall within the spirit and scope of the present invention, limited solely by the appended claims. All patents and references referred to herein, including those discussed in such patents and references, are hereby incorporated by reference.

We claim:

1. An intumescent rod for fire rated applications comprising a first component comprising an intumescent material in a polymer matrix, said first component being foamed; wherein the intumescent rod has a length of at least 20 times its cross-sectional dimension and is compressible and deformable for packing a gap and remaining in place prior to expansion of the intumescent material upon the application of heat.

2. The intumescent rod of claim 1 further comprising a second component wherein:
   a) the first component comprises a core substantially contained within a covering formed of the second component;
   b) the first component comprises a covering that substantially covers a core of the second component; or
   c) the first component is formed adjacent to the second component.

3. The intumescent rod of claim 2 wherein the second component comprises a polymer.

4. The intumescent rod of claim 1 wherein the intumescent material is selected from the group consisting of blowing and charring systems such as ammonium poly phosphate or similar phosphate, melamine, and pentaerythritol in a 3:1:1 ratio, graphite, melamine, silicates, sodium silicates, phosphate silicates, lithium silicates, potassium silicates and combinations thereof.

5. The intumescent rod of claim 1 wherein the polymer matrix is taken from the group consisting of polyurethanes, polyethylenes, polyesters, polyethers, polystyrenes, polyvinylchlorides and combinations thereof.

6. The intumescent rod of claim 2 wherein the second component comprises a material selected from the group consisting of polyurethane, polyethylene, polyesters, polyethers, polystyrenes, polyvinylchlorides and combinations thereof.

7. An intumescent rod for fire rated applications comprising:
   a) a first component comprising an intumescent material in a polymer matrix, and
   b) a second component coupled with the first component, wherein at least one of the first component and the second component is foamed; and further wherein the intumescent rod has a length of at least 20 times its cross-sectional dimension and is compressible and deformable for packing a gap and remaining in place prior to expansion of the intumescent material upon the application of heat.

8. The intumescent rod of claim 7 wherein both the first component and the second component are foamed.

* * * * *